United States Patent [19]
Liu

[11] Patent Number: 5,864,927
[45] Date of Patent: Feb. 2, 1999

[54] BUCKLE FOR A DOG LEASH

[75] Inventor: Chun Chien Liu, Changhua Hsien, Taiwan

[73] Assignee: Kim Ging Hui Enterprise Limited, Changhua Hsien, Taiwan

[21] Appl. No.: 928,918

[22] Filed: Sep. 12, 1997

[51] Int. Cl.$^6$ .................................................. A44B 11/06
[52] U.S. Cl. ............................................................ 24/163 R
[58] Field of Search .............................. 119/797; 24/170, 24/168, 163 R, 569, 191, 574

[56] References Cited

U.S. PATENT DOCUMENTS

| | | | |
|---|---|---|---|
| 1,201,770 | 10/1916 | Silsby | 24/168 |
| 1,469,929 | 10/1923 | Ledwinka | 24/168 |
| 3,203,421 | 8/1965 | Bialick. | |
| 4,893,835 | 1/1990 | Linden | 297/483 X |
| 5,579,561 | 12/1996 | Smith et al. | 24/170 |
| 5,666,909 | 9/1997 | Dupre | 119/797 |

*Primary Examiner*—James R. Brittain
*Attorney, Agent, or Firm*—Pro-Techtor International Services

[57] ABSTRACT

A buckle for a dog leash includes a base frame defining a recessed flat receiving space for receiving a leash, a cover frame having a fixed end pivotally connected to one end of the base frame, and a free end detachably secured to an opposite end of the base frame. A lock screw member fixes the free end of the cover frame to the base frame to permit the dog leash to be firmly retained between the base frame and the cover frame. Holding down screws threaded into screw holes in the base frame clamp the leash in the buckle.

6 Claims, 7 Drawing Sheets

BUCKLE FOR A DOG LEASH

BACKGROUND OF THE INVENTION

The present invention relates to buckles, and more particularly to a buckle specifically designed for fastening to a dog leash to fix a part of the leash into a loop.

When walking with a dog, a harness 5 and a leash 4 may be used and fastened to the dog so that the dog can be pulled by hand (see FIGS. 1 and 2). A regular dog leash, as shown in FIG. 1 and referenced by 4, comprises a swivel hook 42 with a spring latch 43 at one end, and a handle 41 at an opposite end. When the spring latch 42 is opened, the swivel hook 42 can then be hung on a ring 51 of the harness 5 or a collar for a dog. Because the leash 4 is designed for an individual dog only, two leashes are used when walking two dogs. Furthermore, when carrying a dog in a motor vehicle a fastening device may be used to fix the leash of the dog in place.

SUMMARY OF THE INVENTION

It is one object of the present invention to provide a buckle for a dog leash which can be conveniently fastened to a dog leash to set a part of the leash into a loop for fastening to a second dog. It is another object of the present invention to provide a buckle for a dog leash which can be conveniently fastened to a dog leash, so that it can be fixed to a vehicle seat or support means. According to the preferred embodiment of the present invention, the buckle comprises a base frame defining a recessed flat receiving space for receiving a dog leash, a cover frame having a fixed end pivoted to one end of the base frame, and a free end detachably secured to an opposite end of the base frame. A lock screw member is adapted to fix the free end of the cover frame to the base frame to allow the dog leash to be firmly retained between the base frame and the cover frame. Holding down screws threaded into screw holes in the base frame hold down the dog leash.

DETAILED DESCRIPTION OF THE PREFERRED EMBODIMENT

Figure 1:
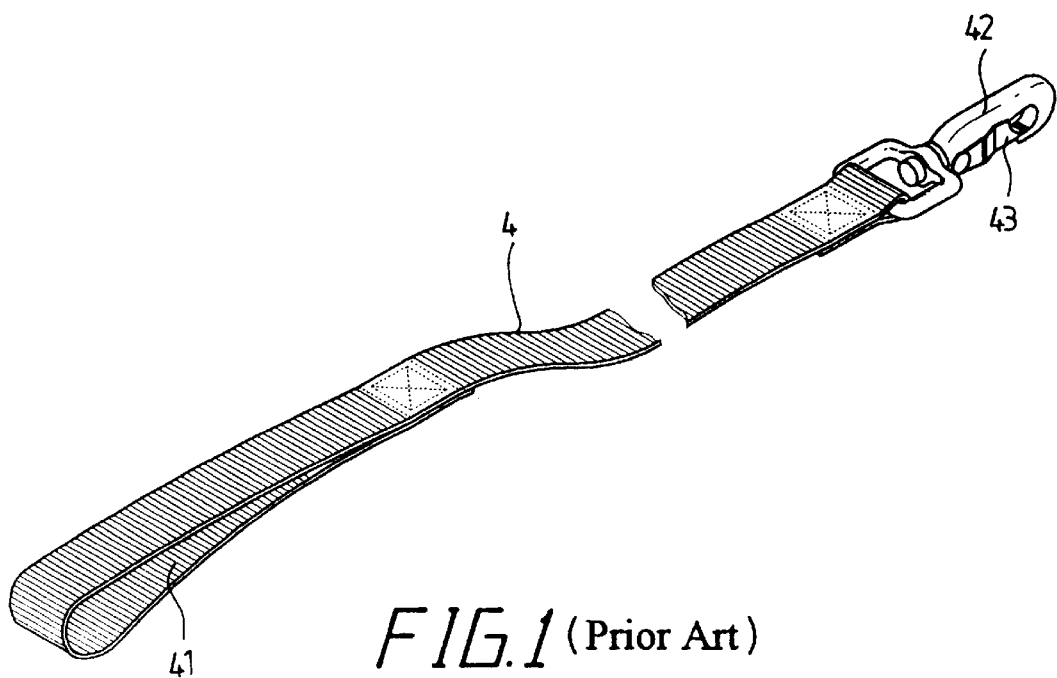
FIG. 1 shows a regular dog leash.
Figure 2:
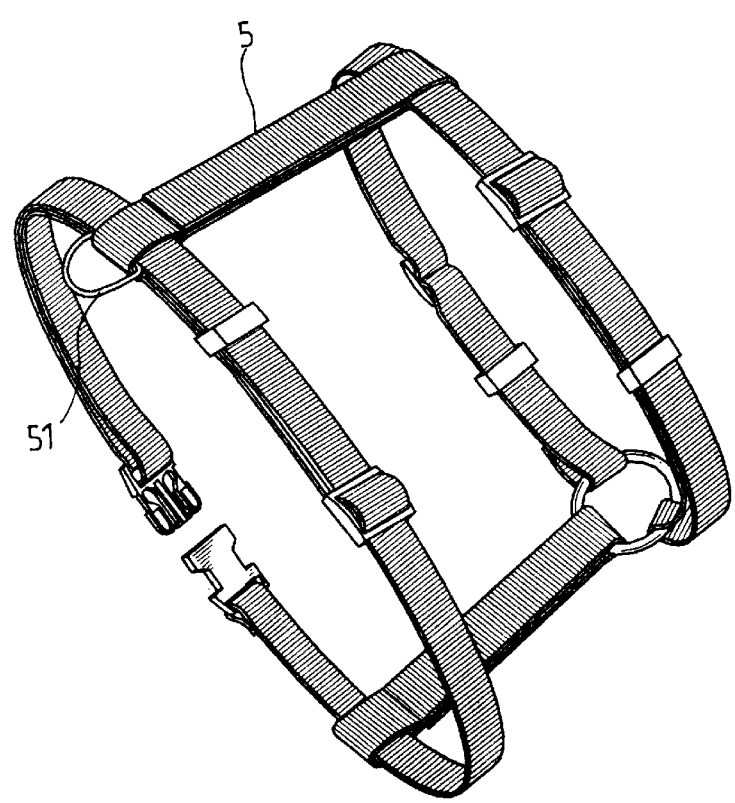
FIG. 2 is a perspective view of a regular harness for a dog.
Figure 3:
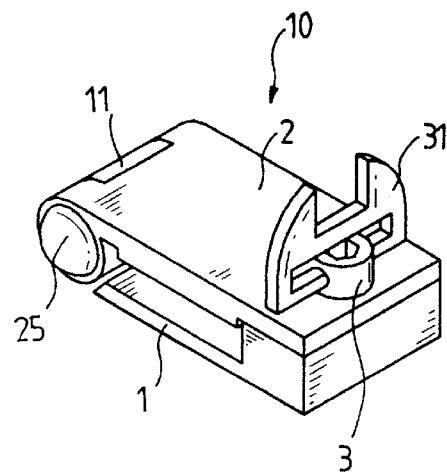
FIG. 3 is an elevational view of a buckle according to the present invention.
Figure 4:
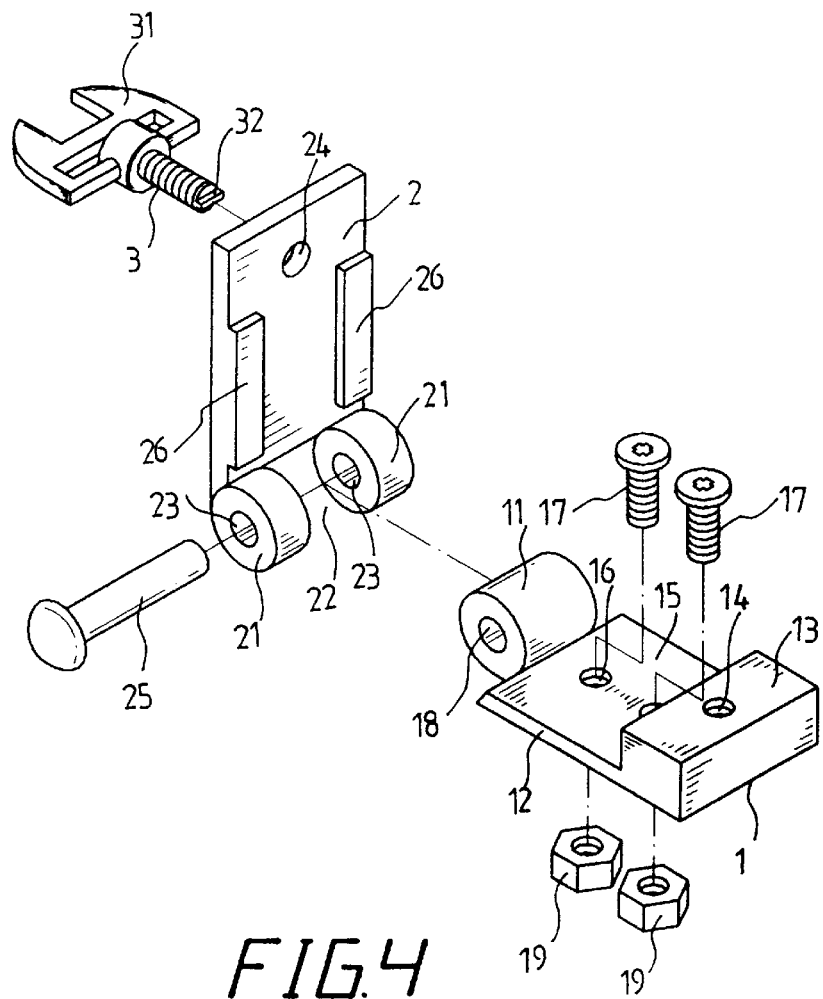
FIG. 4 is an exploded view of the buckle shown in FIG. 3.
Figure 5:
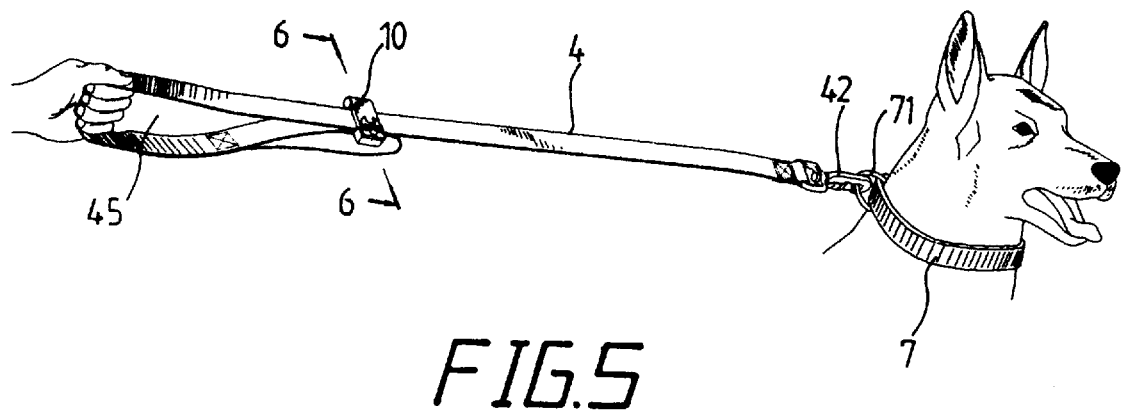
FIG. 5 shows an application of the present invention.
Figure 6:
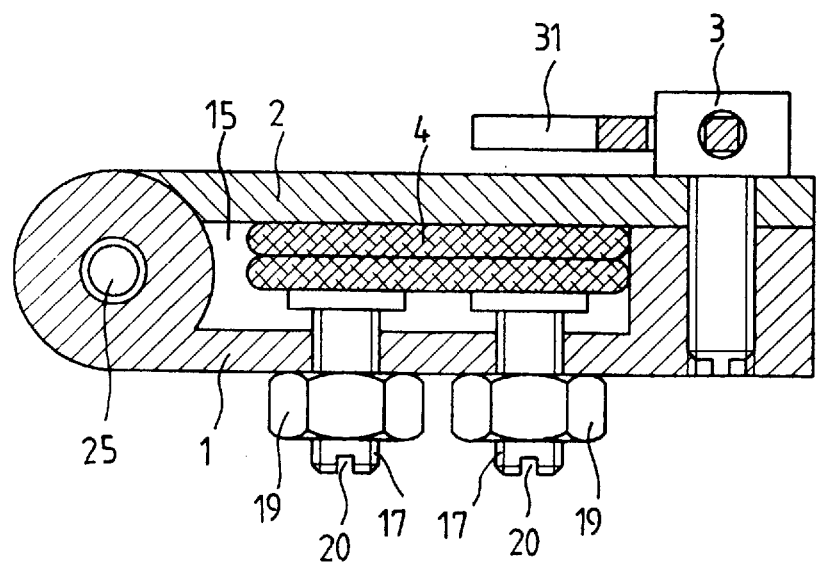
FIG. 6 is a sectional view in an enlarged scale taken along line 6—6 of FIG. 5.
Figure 7:
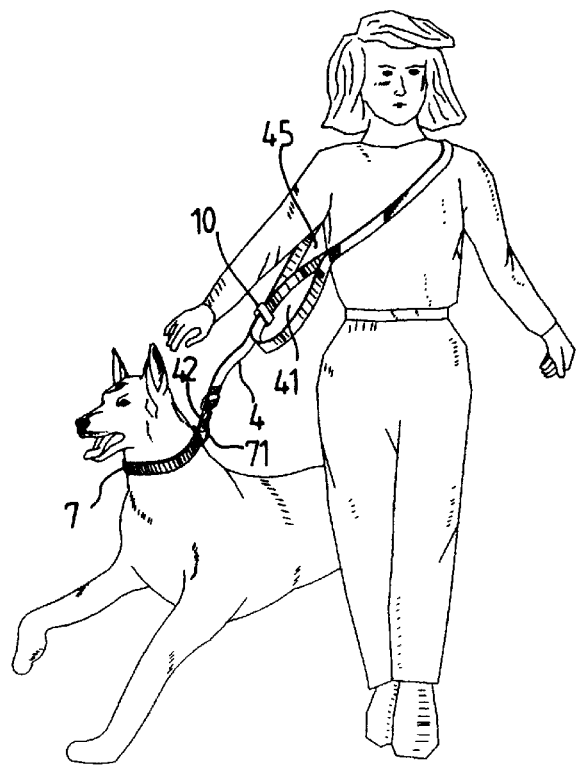
FIG. 7 shows another application of the present invention.
Figure 8:
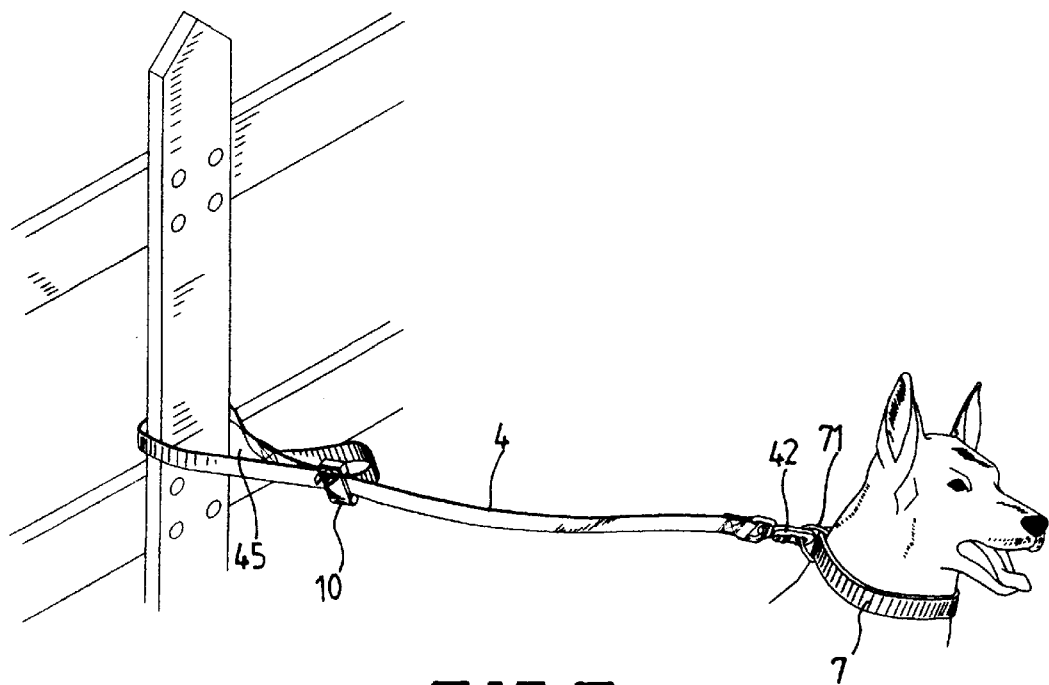
FIG. 8 shows still another application of the present invention.

Referring to FIGS. 3 and 4, a buckle 10 for a dog leash in accordance with the present invention is generally comprised of a base frame 1, a cover frame 2, and a screw member 3. The base frame 1 comprises a flat bottom plate 12 with two first screw holes 16 therein. A flat locating block 13 is integral with the flat bottom plate 12 at one end. A second screw hole 14 is located in the flat locating block 13. A barrel 11 is connected to one end of the flat bottom plate 12 remote from the flat locating block 13, and includes a center through hole 18. A receiving space 15 is thereby defined above the flat bottom plate 12 and between the barrel 11 and the flat locating block 13. Two holding down screws 17 are threaded into the first screw holes 16 of the base frame 1 and secured with nuts 19. The holding down screws 17 are adapted for securing a leash between the base frame I and the cover frame 2. The cover frame 2 comprises two bosses 21 bilaterally disposed at one end of the cover frame 12 and defining a respective center through hole 23. A gap 22 is defined between the bosses 21 and is adapted to receive the barrel 11 of the base frame 1. A through hole 24 at the end remote from the gap 22 receives the screw member 3. Two elongated pressure blocks 26 are longitudinally raised from the bottom side of the cover frame and are bilaterally spaced between the bosses 21 and the through hole 24.

When the barrel 11 of the base frame 1 is inserted into the gap 22 between the bosses 21 of the cover frame 2, a pivot shaft 25 is inserted through the center through holes 23; 18 of the bosses 21 and the barrel 11 respectively, permitting the base frame 1 and the cover frame 2 to be pivotally connected.

The screw member 3 is inserted through the through hole 24 of the cover frame 2 and threaded into the second screw hole 14 of the base frame 1 to fix the cover frame 2 to the base frame 1 in a closed position. By means of a handle 31, the screw member 3 can be conveniently turned in and out of the second screw hole 16 by hand.

Referring to FIGS. 4 to 8, the leash, referenced by 4, has a swivel hook 42 at one end fastened to a ring 71 on a collar 7 around the neck of a dog, and an handle 41 at an opposite end. The handle 41 of the leash 4 is inserted through the receiving space 15 between the base frame 1 and cover frame 2 of the buckle 10. The leash 4 is then returned to the receiving space 15 and secured in place by the holding down screws 17 to form a loop 45 for hanging on one's shoulder (see FIG. 7) or an upright support (see FIG. 8).

When the leash 4 is mounted in the receiving space 15, the cover frame 2 is closed on the base frame 1 and secured in place by threading the screw member 3 into the second screw hole 14 of the base frame 1. The holding down screws 17 are threaded inwards to hold down the leash 4 against the pressure blocks 26 of the cover frame 2. Therefore, the buckle 10 is fixedly secured to the leash 4. After installation, the pivoted handle 31 is turned from a vertical position to a horizontal position parallel to the cover frame 2. Further, each holding down screw 17 has a slot 20 at its bottom end (see FIG. 6). The screw member 3 has a bottom end terminating in a flat tip that fits the slot 20 of the holding down screws 17 (see FIG. 4). Therefore, the screw member 3 can be used as a screwdriver for turning the holding down screws 17.

Figure 9:
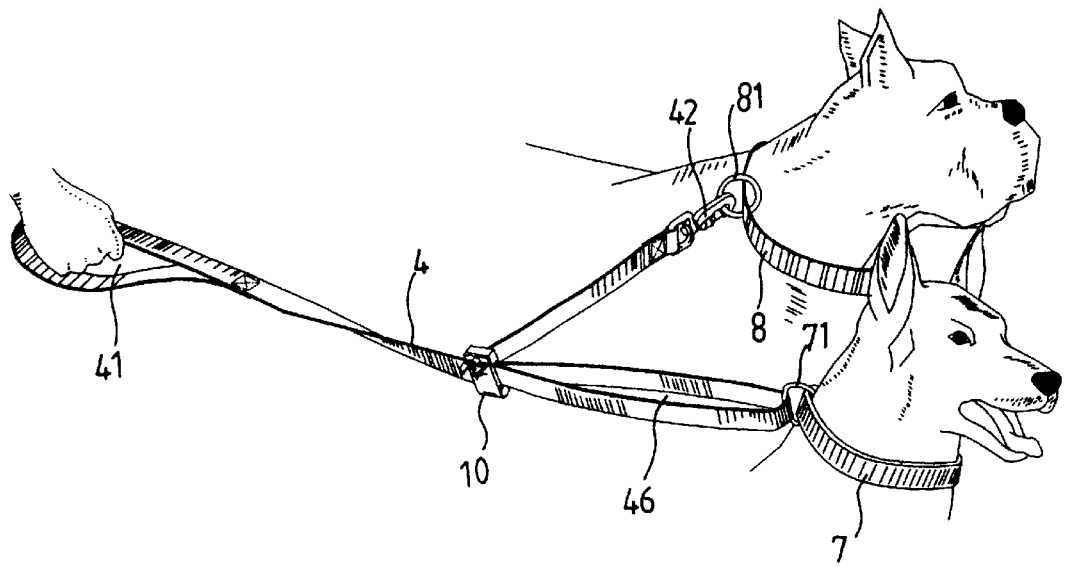
FIG. 9 shows still another application of the present invention.

Referring to FIG. 9, the buckle 10 can be fastened to a middle part of the leash 4 to form a loop 46 in the middle. This allows the looped middle part of the leash 4 to be secured to the ring 71 of the collar 7 on a first dog and the swivel hook 42 of the leash 4 fastened to a ring 81 of a collar 8 on a second dog.

Figure 10:
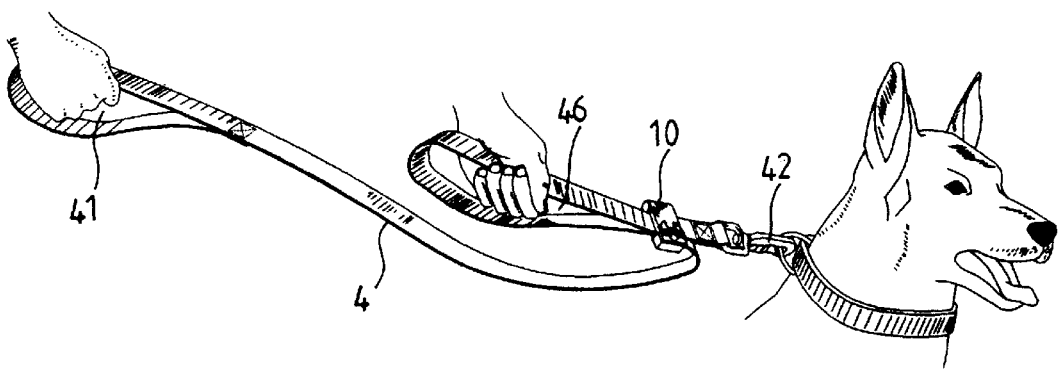
FIG. 10 shows still another application of the present invention.

FIG. 10 shows the buckle 10 fastened to a middle part of the leash 4 to form a loop 46 in the middle. This allows the user to hold the handle 41 and the loop 46 to pull the dog with both hands.

Figure 11:
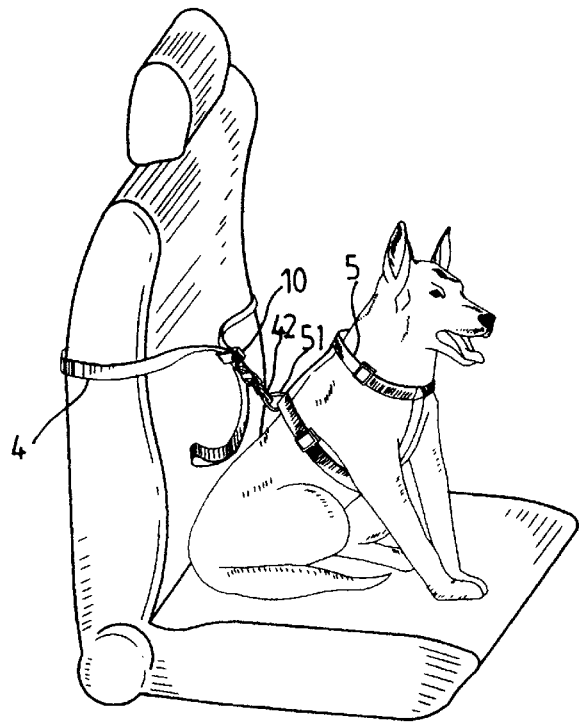
FIG. 11 shows still another application of the present invention.

FIG. 11 shows still another application of the present invention, in which the leash 4 is connected to a ring 51 of a harness 5 on a dog sitting on a car's front seat and fastened to a back of the front seat by the buckle 10.

Figure 12:
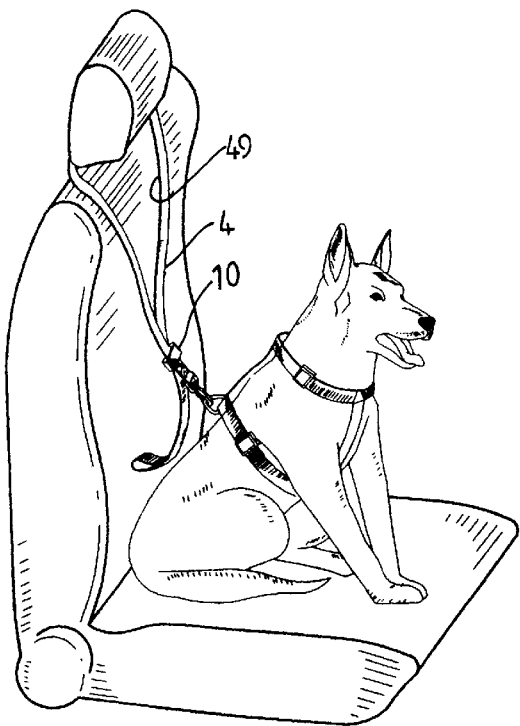
FIG. 12 shows still another application of the present invention.

FIG. 12 shows still another application of the present invention, in which the buckle 10 is fastened to the leash 4 which is fastened to a harness 5 on a dog sifting on a car's front seat. A loop 49 is formed at one end of the leash 4 and hung on a head rest of the front seat.

Figure 13:
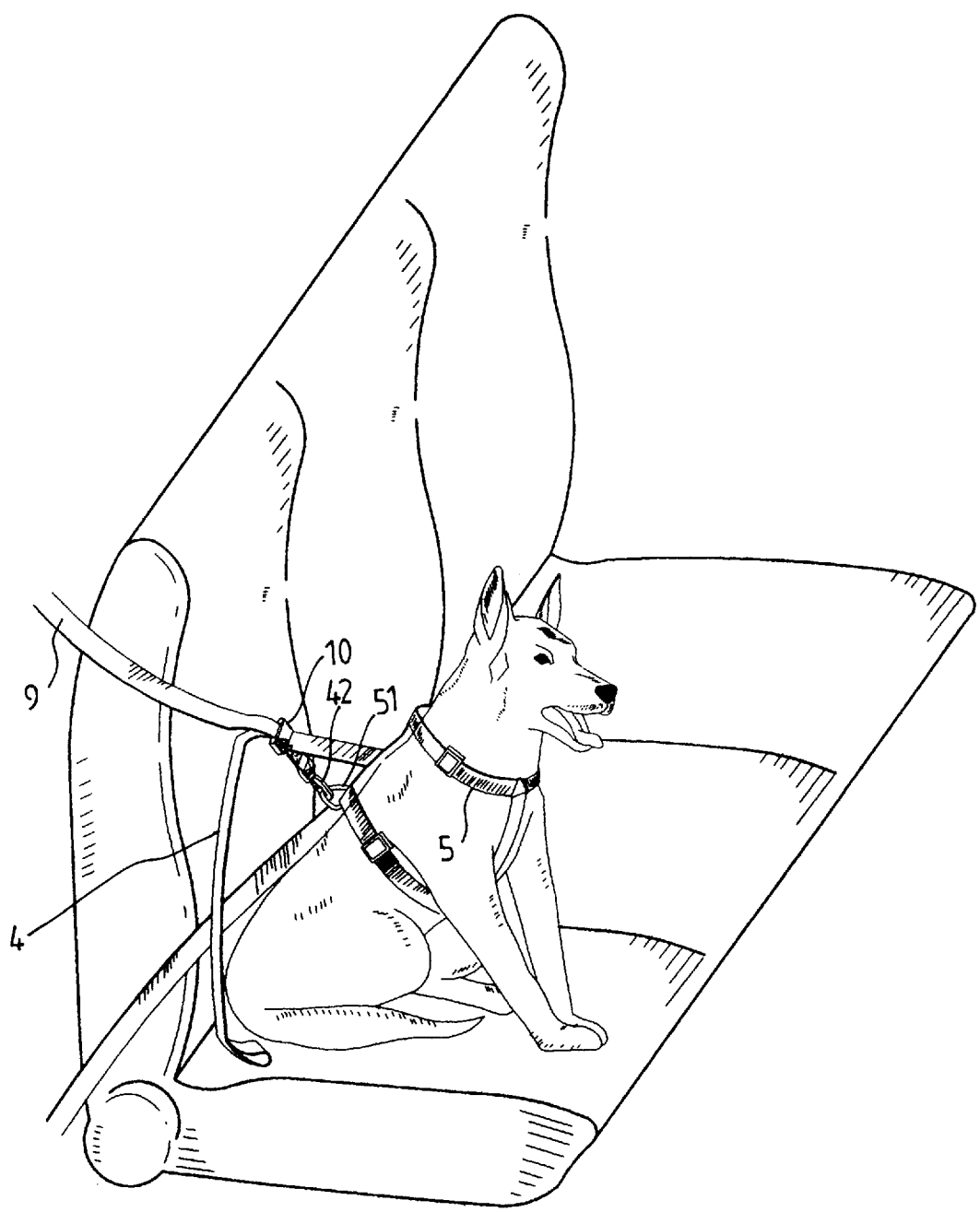
FIG. 13 shows still another application of the present invention.

FIG. 13 shows still another application of the present invention, in which the leash 4 is fastened to a safety belt 9 on a car's rear seat by the buckle 10. The swivel hook 42 of the leash 4 is fastened to a ring 51 on a harness 5 on a dog sitting on the car's rear seat.

It is to be understood that the drawings are designed for purposes of illustration only, and are not intended as a definition of the limits and scope of the invention disclosed.

What the invention claimed is:

1. A buckle comprising:

a base frame, said base frame comprises a flat bottom plate with at least one first screw hole therein, a flat locating block integral with one end of said flat bottom plate, a second screw hole being located in said flat locating block, a barrel connected to the end of said flat bottom plate remote from said flat locating block, and a receiving space defined above said flat bottom plate and between the barrel and flat locating block of said base frame;

a cover frame pivotally connected to said base frame and adapted to enclose said receiving space so that a leash is firmly retained in said receiving space between said base frame and said cover frame, said cover frame comprises two bosses bilaterally disposed at a first end of said cover frame, said cover frame is pivotally connected to said barrel of said base frame by a pivot shaft, a through hole at a second end of said cover frame corresponds to the second screw hole of said base frame;

a corresponding at least one holding down screw threaded into the at least one first screw hole of said base frame, said holding down screw is adapted to secure the leash in said receiving space; and a lock screw member inserted through the through hole of said cover frame and threaded into the second screw hole of said base frame to fix said cover frame to said base frame to secure the leash in said receiving space.

2. The buckle of claim 1, wherein:

said cover frame comprises two elongated pressure blocks on a bottom side thereof, said pressure blocks are adapted to impart pressure to the leash in said receiving space against the flat bottom plate of said base frame.

3. The buckle of claim 1, wherein:

said lock screw member comprises a handle to facilitate turning said lock screw member by hand.

4. The buckle of claim 1, wherein:

said lock screw member is a butterfly bolt.

5. The buckle of claim 1, wherein:

each said holding down screw has a slot at a bottom end, said bottom end of said holding down screw extends outside said bottom frame to allow said slot to receive a screwdriver.

6. The buckle of claim 5, wherein:

said lock screw member has a bottom end terminating in a flat tip that fits said slot of said holding down screws.

* * * * *